(12) United States Patent
Koch

(10) Patent No.: US 7,775,924 B2
(45) Date of Patent: Aug. 17, 2010

(54) HYDRAULIC TENSIONING DEVICE FOR A TRACTION MECHANISM DRIVE

(75) Inventor: Reinhard Koch, Wachenroth (DE)

(73) Assignee: Schaeffler KG, Herzogenaurach (DE)

( * ) Notice: Subject to any disclaimer, the term of this patent is extended or adjusted under 35 U.S.C. 154(b) by 200 days.

(21) Appl. No.: 11/573,801

(22) PCT Filed: Jul. 16, 2005

(86) PCT No.: PCT/EP2005/007775

§ 371 (c)(1),
(2), (4) Date: Apr. 12, 2007

(87) PCT Pub. No.: WO2006/021271

PCT Pub. Date: Mar. 2, 2006

(65) Prior Publication Data

US 2007/0270259 A1 Nov. 22, 2007

(30) Foreign Application Priority Data

Aug. 19, 2004 (DE) .................... 10 2004 040 222

(51) Int. Cl.
*F16H 7/08* (2006.01)
(52) U.S. Cl. .................... 474/110; 474/109; 251/337; 251/339
(58) Field of Classification Search ............ 474/101, 474/104, 109, 110, 140; 251/337, 339
See application file for complete search history.

(56) References Cited

U.S. PATENT DOCUMENTS

| | | | |
|---|---|---|---|
| 3,483,888 A | 12/1969 | Wurzel | |
| 4,700,741 A | 10/1987 | Murphy | |
| 4,756,335 A | 7/1988 | Kim | |
| 6,193,623 B1* | 2/2001 | Koch et al. | 474/110 |
| 6,322,468 B1* | 11/2001 | Wing et al. | 474/110 |
| 6,361,458 B1* | 3/2002 | Smith | 474/109 |
| 7,244,204 B2* | 7/2007 | Yoshida et al. | 474/110 |
| 2003/0216202 A1* | 11/2003 | Emizu et al. | 474/109 |

FOREIGN PATENT DOCUMENTS

| | | |
|---|---|---|
| EP | 0952375 | 10/1999 |
| EP | 1067314 | 1/2001 |
| EP | 1101975 | 5/2001 |
| JP | 2004176821 | 6/2004 |
| JP | 2004176821 A * | 6/2004 |
| WO | 98/05883 | 2/1998 |

* cited by examiner

*Primary Examiner*—Robert A Siconolfi
*Assistant Examiner*—Anna Momper
(74) *Attorney, Agent, or Firm*—Volpe and Koenig, P.C.

(57) ABSTRACT

A hydraulic tensioning device is provided for a traction mechanism drive, in particular for a chain or belt drive of an internal combustion engine. The device includes a tensioning piston which is guided in a displaceable manner in a cylinder, with a pressure chamber being defined between the tensioning piston and the cylinder which is used to receive hydraulic fluid. A pressure relief valve is provided which limits the pressure in the pressure chamber. The pressure relief valve (8) includes, at least partially, a pre-assembled assembly (10) which can be inserted or is inserted into the tensioning piston (4).

16 Claims, 2 Drawing Sheets

HYDRAULIC TENSIONING DEVICE FOR A TRACTION MECHANISM DRIVE

BACKGROUND

The invention relates to a hydraulic tensioning device for a traction mechanism drive, in particular for a chain or belt drive of an internal combustion engine, comprising a tensioning piston, which is guided in a displaceable manner in a cylinder, a pressure chamber, which is defined by the tensioning piston and the cylinder and which is used to receive hydraulic fluid, and a pressure relief valve, which limits the pressure in the pressure chamber.

In DE 40 35 823 C1, a hydraulic tensioning device for traction mechanism drives, such as chain or belt drives in internal combustion engines, is described. A tensioning piston pressed against the chain is held in a displaceable manner longitudinally in a cylinder. The tensioning piston and the cylinder define a pressure chamber for receiving hydraulic fluid. Tensioning movements of the tensioning piston in the direction towards the chain increase the size of the pressure chamber, and a non-return valve opens due to the low pressure set therein and motor oil can flow into the pressure chamber. Through tension from the chain, the tensioning piston is pressed inward, that is, away from the chain, wherein the pressure chamber becomes smaller. While the tensioning piston moves inward, motor oil is forced out of the pressure chamber through an overflow gap. The damping behavior of the tensioning device can be influenced by the size of the overflow gap. If the pressure in the pressure chamber becomes too large, the pressure relief valve opens.

A similar chain tensioner is known from DE 100 38 606 A1. The pressure relief valve of this chain tensioner is essentially formed by a valve ball, which is pressed by a compression spring against a valve seat formed on a bushing in the interior of the tensioning piston. If the pressure in the interior of the pressure chamber exceeds a set limit, the valve ball is pushed against the force of the valve spring, so that the motor oil can leak from the chamber. When the chain tensioner is assembled, the piston is located in the vertical position and the valve spring is used in the interior of the piston. Because the valve spring is not pre-tensioned in this state, the valve ball must be balanced on the valve spring until additional components are mounted. Therefore, it is very difficult to mount such a chain tensioner with an assembly robot without generating defects.

SUMMARY

Therefore, the invention is based on the objective of providing a hydraulic tensioning device for a traction mechanism drive, which can be assembled easily and securely.

To meet this objective, for a hydraulic tensioning device for a traction mechanism drive of the type noted above, it is provided that the pressure relief valve is comprised at least partially of a pre-assembled assembly that can be inserted or that is inserted into the tensioning piston.

Through the use of the assembly provided according to the invention, which comprises at least parts of the pressure relief valve, it is not necessary to balance the valve ball on the valve spring for the assembly. Simultaneously, the assembly automatically guarantees that the ball correctly contacts the valve spring. Another advantage is seen in that the assembly can be mounted with an assembly robot.

In another construction of the invention, the assembly comprises a receptacle body as a stationary valve element, which can be connected or is connected to a cage holding a moving valve element. The assembly thus comprises the receptacle body, the cage, and the moving valve element. These components are pre-assembled and inserted as an assembly into the tensioning piston. The assembly is constructed so that it always lies correctly on the valve spring.

For the tensioning device according to the invention, it is preferred that the moving valve element is constructed as a valve ball. In addition, other constructions are conceivable, for example, the moving valve element could be constructed as a cone.

An especially high reliability of the tensioning device according to the invention is achieved when a valve seat, which can be sealed by the moving valve element, is constructed on the receptacle body for the cage. In conventional tensioning devices, the valve seat is mostly realized by another separate component. In contrast, an additional component in the tensioning device according to the invention can be eliminated, because the receptacle body holds, on one hand, the cage for the moving valve element and has, on the other hand, the valve seat.

In connection with this, it is also especially advantageous that the tensioning device according to the invention can have a throttling port on the receptacle body. Up until now, this throttling port was realized by means of a separate part, which can now be eliminated.

Problem-free functioning of the tensioning device according to the invention can be guaranteed in that the cage has one or more projections, which holds or hold the moving valve element in the interior of the cage, at least on one side. For putting together the assembly, the moving valve element can be pressed over the projections into the cage. The cage has no effect on the function of the moving valve element, but instead is used merely for securing the valve element during assembly. In another construction of the invention, it can be provided that the cage preferably has an annular construction and has two opposing projections at least on one cage side. The two projections prevent the moving valve element from moving out of the cage.

To further simplify the mounting of the assembly of the tensioning device according to the invention, it is provided that the opposing projections are constructed on two cage sides. Because the cage is symmetric about a center plane, complicated positioning before introducing the moving valve element can be eliminated.

In the tensioning device according to the invention, the cage can be fixed in the receptacle body so that the cage can be inserted or is inserted into the receptacle body with a non-positive fit and/or positive fit. It is possible that the external contours of the cage have a non-round, especially polygonal, construction, whereby additional attachment elements can be eliminated. In other embodiments, the cage can have retaining projections or retaining tabs on its outer side. Alternatively or additionally, a securing element, such as a securing ring, can also be used, in order to hold the assembly comprising the receptacle body and the cage at its position in the tensioning piston.

It is especially preferred that the cage of the tensioning device according to the invention is comprised of a plastic material. The receptacle body can be comprised of metal, preferably steel.

BRIEF DESCRIPTION OF THE DRAWINGS

Additional advantages and details of the invention emerge from the following description of an exemplary embodiment and also with reference to the figures. The figures are schematic drawings and show.

DETAILED DESCRIPTION OF THE PREFERRED EMBODIMENTS

Figure 1:
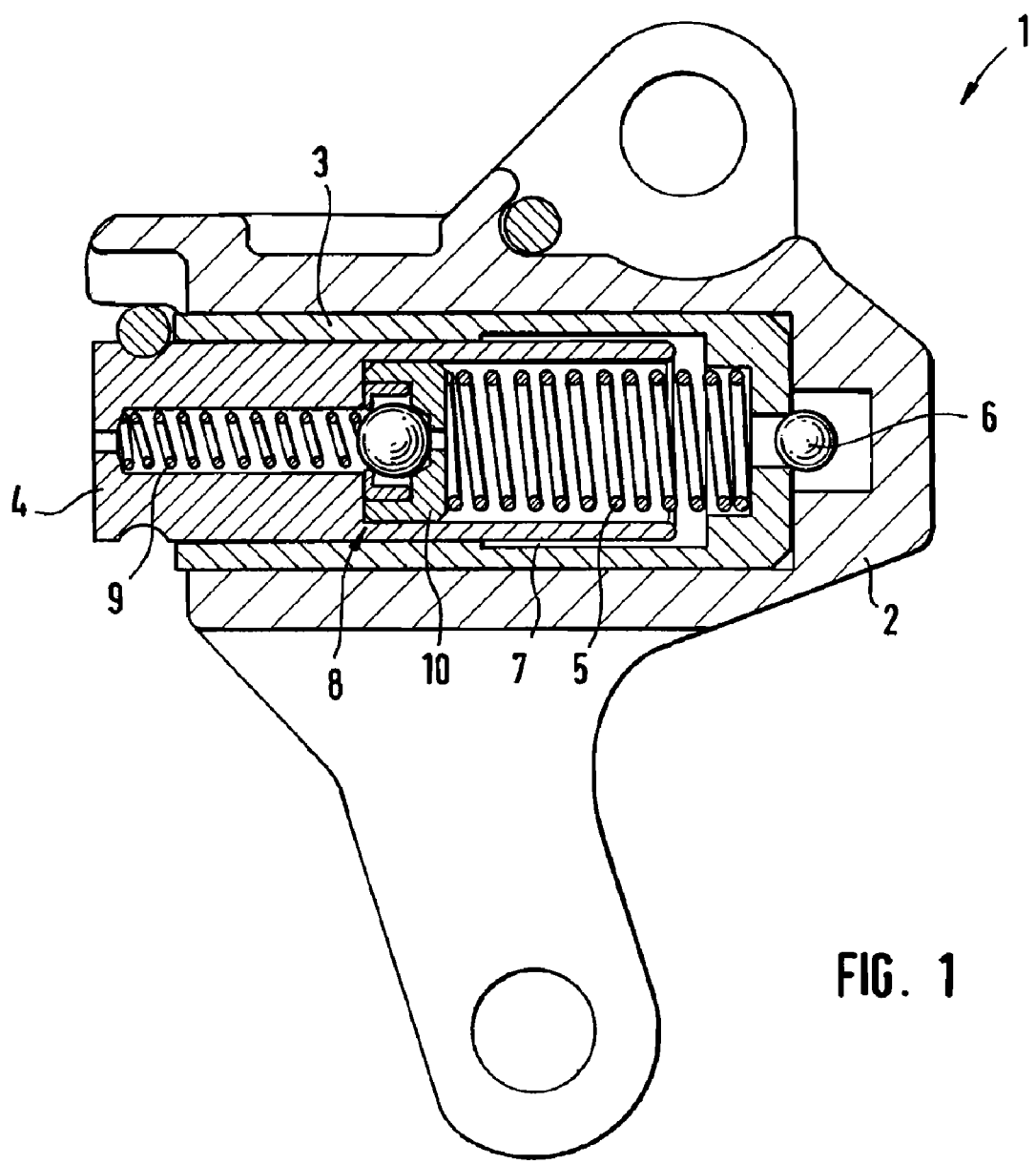
FIG. 1 is a partially cross-sectioned assembly drawing of the hydraulic tensioning device according to the invention.

FIG. 1 shows a partially cross-sectioned assembly drawing of a hydraulic tensioning device. The shown tensioning device is a chain tensioner and is used for tensioning the chain drive of an internal combustion engine.

The hydraulic tensioning device 1 is essentially comprised of a housing 2, in which a tensioning hydraulic element housing 3 is inserted. A tensioning piston 4 is held in a displaceable manner in the axial direction in the interior of the tensioning hydraulic element housing 3. During operation, the front surface of the tensioning piston 4 contacts the chain drive.

The tensioning hydraulic element housing 3, which is used simultaneously as the cylinder for the tensioning piston 4, and the tensioning piston 4 form a pressure chamber, which is filled with hydraulic fluid, typically motor oil. In this pressure space, a tensioning main spring 5 is arranged, which is constructed as a compression spring and which presses the tensioning piston 4 so far outward against the chain until equilibrium is reached between the spring force and the pressing force. If the tensioning piston is pushed in the direction towards the chain, then the pressure chamber becomes larger. Due to the low pressure set therein, a non-return valve 6 opens, which is indicated in FIG. 1, so that motor oil can flow into the pressure chamber.

If the chain is re-tensioned, the tensioning piston 4 is pressed into the tensioning hydraulic element housing 3, which decreases the size of the pressure chamber. Motor oil is forced out of the pressure chamber through an overflow gap 7 between the tensioning piston 4 and the tensioning hydraulic element housing 3. Therefore, during normal operation, the tensioning piston 4 realizes an oscillating motion, wherein the piston displacement can equal around 5/10 mm. Because the chain expands with advancing age, the tensioning piston 4 is gradually pushed outward from the tensioning hydraulic element housing 3, so that a chain lengthened due to age is also reliably tensioned.

If the pressure in the pressure chamber becomes too great, a pressure relief valve 8 opens, so that the motor oil can leak through an axial opening in the tensioning piston 4. The pressure relief valve 8 comprises a pre-assembled assembly 10 composed of a receptacle body, a cage, and a valve ball, and also a pressure relief spring 9. In the receptacle body there is a throttling port, whose size affects the damping behavior of the tensioning device.

Figure 2:
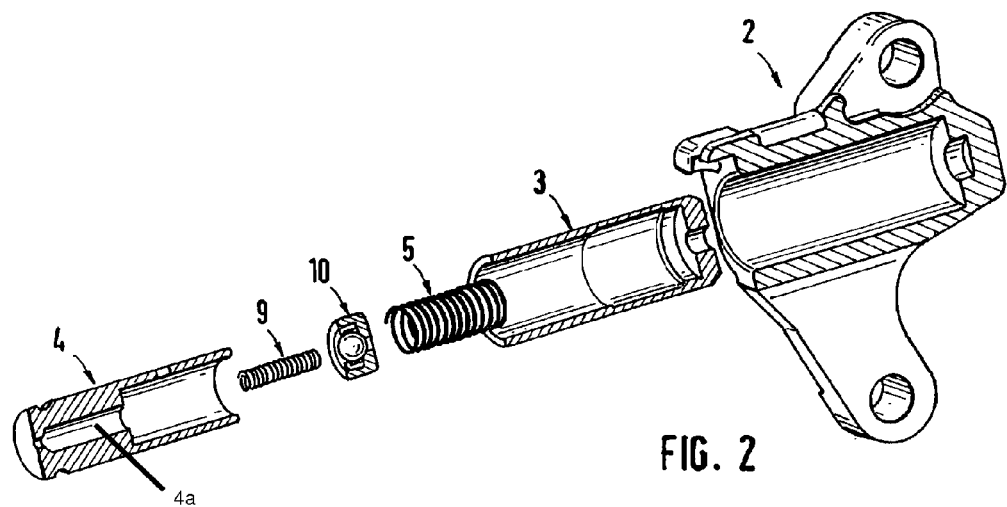
FIG. 2 is an exploded view of the tensioning device shown in FIG. 1.

FIG. 2 shows an exploded view of the tensioning device 1 shown in FIG. 1. For the assembly of the tensioning device 1, if the pressure relief spring 9 is inserted into the vertical tensioning piston 4, then the pre-assembled assembly 10 comprised of the receptacle body, cage, and valve body can be set on the pressure relief spring 9. The outer contours of the assembly 10 are adapted to the inner form of the tensioning piston 4, so that the assembly 10 is guided in the tensioning piston 4. In this way, the valve ball is positioned and centered automatically on the pressure relief spring 9 within bore 4a, which is sized to exclude the pre-assembled assembly. The pre-assembled assembly 10 can be mounted with the pressure relief spring 9 onto the pressure relief valve 8 by an assembly robot.

Figure 3:
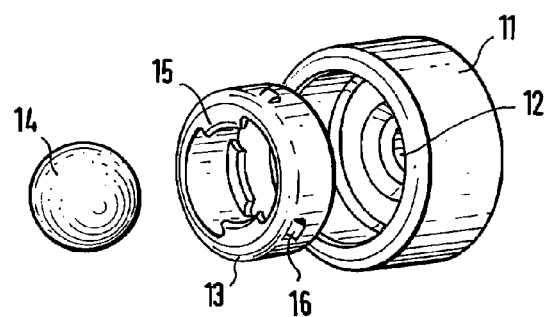
FIG. 3 is an assembly with receptacle body, cage, and valve ball.

FIG. 3 shows an assembly with receptacle body, cage, and valve ball.

The receptacle body 11 has an essentially annular construction and is open on one side. The opposite, rear side of the receptacle body 11 in FIG. 3 is closed up to a throttling port 12. The outer contours of the receptacle body 11 are adapted to the inner contours of the tensioning piston 4. A cage 13, in which a valve body 14 can be introduced, can be inserted into the interior of the receptacle body 11. The valve ball 14 is preferably made from steel, but the materials of glass, ceramic, or plastic also come into play.

The cage 13 has two opposing radial projections, which must be negotiated when introducing the valve ball 14 into the cage 13, on one or two sides. The cage 13 can be comprised of a plastic material, so that the projections 15 are pressed to the side when the valve ball 14 is pressed elastically and then return back to their original position. In the shown embodiment, projections are also provided on the opposite side of the cage 13, so that the valve ball 14 can be mounted from both sides of the cage 13.

To guarantee secure holding of the cage 13 in the receptacle body 11, the cage 13 has several projecting retaining tabs 16, which are distributed over the periphery and which can lead to a positive-fit or non-positive fit connection. In other constructions, the outer contours of the cage 13 can have a non-round construction, approximately in the shape of a polygon.

Figure 4:
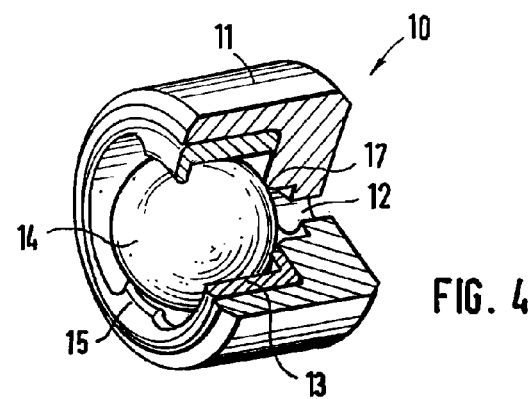
FIG. 4 is the assembly shown in FIG. 3 after being put together.

FIG. 4 shows the assembly 10 shown in FIG. 3 after being put together. The cage 13 is used merely to simplify the mounting of the ball 14, in that it secures the ball 14. After mounting, the cage 13 has no function any longer. The cage 13 automatically centers the ball 14, so that it seals a valve seat 17 formed in the interior of the receptacle body 11. The cage 13 is constructed so that it does not prevent axial movement of the ball 14 when the valve opens and closes. Because the assembly 10 is compact, it can also be inserted into small tensioning pistons.

REFERENCE NUMBERS

1 Tensioning device
2 Housing
3 Tensioning hydraulic element housing
4 Tensioning piston
5 Tensioning main spring
6 Non-return valve
7 Overflow gap
8 Pressure relief valve
9 Pressure relief spring
10 Assembly
11 Receptacle body
12 Throttling port
13 Cage
14 Valve ball
15 Projection
16 Retaining tab
17 Valve seat

The invention claimed is:

1. Hydraulic tensioning device for a traction mechanism drive of an internal combustion engine, comprising a tensioning piston, which is guided in a displaceable manner in a cylinder, a pressure chamber, which is defined by the tensioning piston and the cylinder and which is used for receiving hydraulic fluid, and a pressure relief valve, which limits a pressure in the pressure chamber, the pressure relief valve is comprised at least partially of a pre-assembled assembly that is insertable into the tensioning piston, wherein the pre-assembled assembly contacts a pressure relief spring located within the piston, wherein the pressure relief spring biases the pressure relief valve to a closed position, is in contact with and located entirely outside of the pre-assembled assembly, wherein the pre-assembled assembly houses a moving valve element that is a valve ball, wherein the assembly comprises a receptacle body as a stationary valve element, which is connected to a cage holding the moving valve element.

2. Tensioning device according to claim 1, wherein a valve seat, which can be sealed by the moving valve element, is provided on the receptacle body.

3. Tensioning device according to claim 1, wherein a throttling port is provided on the receptacle body.

4. Tensioning device according to claim 1, wherein the cage has one or more projections, which hold the moving valve element in an interior of the cage, at least on one side.

5. Tensioning device according to claim 4, wherein the cage has an annular construction and the one or more projections comprise at least two opposing projections on at least one side of the cage.

6. Tensioning device according to claim 4, wherein the projection or projections are formed on both cage sides.

7. Tensioning device according to claim 1, wherein the cage is inserted into the receptacle body with a positive fit.

8. Tensioning device according to claim 1, wherein outer contours of the cage have a polygonal construction.

9. Tensioning device according to claim 1, wherein the cage is comprised of a plastic material.

10. Tensioning device according to claim 1, wherein the receptacle body is comprised of metal.

11. Tensioning device according to claim 1, wherein the traction mechanism drive is a chain or belt drive of the internal combustion engine.

12. Tensioning device according to claim 1, wherein the piston comprises an axial bore with a diameter sized to receive the pressure relief spring and exclude the pre-assembled assembly.

13. Tensioning device according to claim 1, wherein the pre-assembled assembly comprises a receptacle with a throttle port against which a ball, under force from the pressure relief spring, fits to close the throttle port.

14. A hydraulic tensioning device for a traction mechanism of an internal combustion engine, comprising:
 a housing;
 a tensioning piston movably mounted within the housing, the tensioning piston including an axial bore having a first diameter and an opening having a second diameter greater than the first diameter and connected to the axial bore by a shoulder formed within the piston;
 a hydraulic fluid pressure chamber defined by the housing and the opening; and
 a pressure relief valve that limits pressure of hydraulic fluid in the hydraulic fluid pressure chamber, the pressure relief valve comprising a pre-assembled assembly that rests on the shoulder and houses a moving valve element, and a spring positioned within the axial bore that biases the moving valve element in a position that closes the pressure relief valve;
 wherein the assembly comprises a receptacle body as a stationary valve element, which is connected to a cage holding the moving valve element.

15. The tensioning device of claim 14, wherein the moving valve element is a valve ball.

16. The tensioning device of claim 14, wherein the spring is located entirely outside of the pre-assembled assembly.

* * * * *